(12) United States Patent
Engelko et al.

(10) Patent No.: US 8,412,739 B2
(45) Date of Patent: Apr. 2, 2013

(54) OPTIMIZATION OF AN UPGRADE PROCESS OF AN ORIGINAL SYSTEM

(75) Inventors: Andrey Engelko, Karlsruhe (DE); Florian Mueller, Mannheim (DE)

(73) Assignee: SAP AG, Walldorf (DE)

( * ) Notice: Subject to any disclaimer, the term of this patent is extended or adjusted under 35 U.S.C. 154(b) by 83 days.

(21) Appl. No.: 13/117,846

(22) Filed: May 27, 2011

(65) Prior Publication Data

US 2012/0303665 A1   Nov. 29, 2012

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | |
|---|---|---|
| 6,456,990 B1 | 9/2002 | Hoffmann et al. |
| 2004/0022414 A1 | 2/2004 | Phillips |
| 2007/0250214 A1 | 10/2007 | Lee et al. |
| 2008/0133211 A1 * | 6/2008 | Dombrowski et al. ......... 703/22 |

* cited by examiner

*Primary Examiner* — Isaac M Woo
(74) *Attorney, Agent, or Firm* — Brake Hughes Bellermann LLP

(57) ABSTRACT

In one general aspect, a computer system can include instructions stored on a non-transitory computer-readable storage medium. The computer system can include a upgrade portion identifier configured to identify a plurality of databases of an original system for upgrade, and a parameter module configured to calculate a plurality of parameter values representing aspects of the plurality of databases. The computer system can also include a fuzzy logic module configured to calculate, using fuzzy logic, a relative ranking of each database from the plurality of databases based on the plurality of parameter values, and a selection module configured to select at least a portion of the plurality of databases for upgrade during uptime of the original system based on a limitation of an upgrade resource and the relative ranking of each database from the plurality of databases.

17 Claims, 8 Drawing Sheets

| Target Upgrade Databases 310 | Parameter Values 320 | | | Normalized Parameter Values 330 | | | Fuzzy Set Membership Values 340 | | | Result Values 350 |
|---|---|---|---|---|---|---|---|---|---|---|
| | Database Size (KB) 322 | Import Size (KB) 324 | Ratio (Database Size / Import Size) 326 | SLOG 332 | ILOG 334 | RLOG 336 | S Class 342 | I Class 344 | R Class 346 | |
| QA | 16 | 5,404 | 337 | -4.1 | -2.9 | 2.5 | 1.0S | 0.75M/ 0.25L | 1.0L | 93.3 |
| QB | 216,432 | 4,519,860 | 21 | 0 | 0 | 1.32 | 1.0L | 1.0L | 0.37M/ 0.63L | 65 |
| QC | 2,964 | 10 | 0.004 | -1.86 | -5.62 | -2.44 | 0.93M/ 0.03L | 1.0S | 1.0S | 6.7 |

FIG. 3

| | 710 | 720 |
|---|---|---|
| RULE 1 | IF ImportSize IS large AND DatabaseSize IS large AND SizeRatio IS small | THEN DatabaseValue IS low |
| RULE 2 | IF ImportSize IS large AND DatabaseSize IS large AND SizeRatio IS medium | THEN DatabaseValue IS medium |
| RULE 3 | IF ImportSize IS large AND DatabaseSize IS large AND SizeRatio IS large | THEN DatabaseValue IS high |
| ..... | ..... | ..... |
| RULE 27 | IF ImportSize IS small AND DatabaseSize IS small AND SizeRatio IS large | THEN DatabaseValue IS high |

FIG. 7

OPTIMIZATION OF AN UPGRADE PROCESS OF AN ORIGINAL SYSTEM

TECHNICAL FIELD

This description relates to selecting databases of an original system during an upgrade process using fuzzy logic.

BACKGROUND

Many known techniques for upgrading portions of an original system can cause an undesirable level of downtime within the original system. For example, using many of these known techniques, all (or nearly all) of the databases of an original system may be unavailable to users while the databases are being upgraded. Also, the upgrading of the databases may necessarily be implemented during a downtime of the entire original system rending the entire original system unavailable to users. The duration and impact of the downtime of the original system and/or unavailability of the databases targeted for upgrade can be aggravated by the unavailability of resources (e.g., storage resources, processing resources) to be used to implement the upgrade process. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include a upgrade portion identifier configured to identify a plurality of databases of an original system for upgrade, and a parameter module configured to calculate a plurality of parameter values representing aspects of the plurality of databases. The computer system can also include a fuzzy logic module configured to calculate, using fuzzy logic, a relative ranking of each database from the plurality of databases based on the plurality of parameter values, and a selection module configured to select at least a portion of the plurality of databases for upgrade during uptime of the original system based on a limitation of an upgrade resource and the relative ranking of each database from the plurality of databases.

In another general aspect, a non-transitory computer-readable storage medium storing code representing instructions that when executed are configured to cause a processor to perform a process. The code can include code to identify a plurality of databases of an original system for upgrade, and calculate a plurality of parameter values representing aspects of the plurality of databases. The code can also include code to calculate, using fuzzy logic, a relative ranking of each database from the plurality of databases based on the plurality of parameter values, and select at least a portion of the plurality of databases for upgrade during uptime of the original system based on a limitation of an upgrade resource and the relative ranking of each database from the plurality of databases.

In yet another general aspect, a method can include executing instructions recorded on a non-transitory computer-readable storage media using at least one processor. The method can include identifying a plurality of databases of an original system for upgrade, and calculating a plurality of parameter values representing aspects of the plurality of database. The method can also include calculating, using fuzzy logic, a relative ranking of each database from the plurality of databases based on the plurality of parameter values, and selecting at least a portion of the plurality of databases for upgrade during uptime of the original system based on a limitation of an upgrade resource and the relative ranking of each database from the plurality of databases.

The details of one or more implementations are set forth in the accompanying drawings and the description below. Other features will be apparent from the description and drawings, and from the claims.

BRIEF DESCRIPTION OF THE DRAWINGS

FIG. 3 is a database that illustrates fuzzy logic input and output values processed by a fuzzy logic module and related to target upgrade databases of an original system.

FIG. 7 is a diagram that illustrates fuzzy logic rules, according to an embodiment.

DETAILED DESCRIPTION

Figure 1:
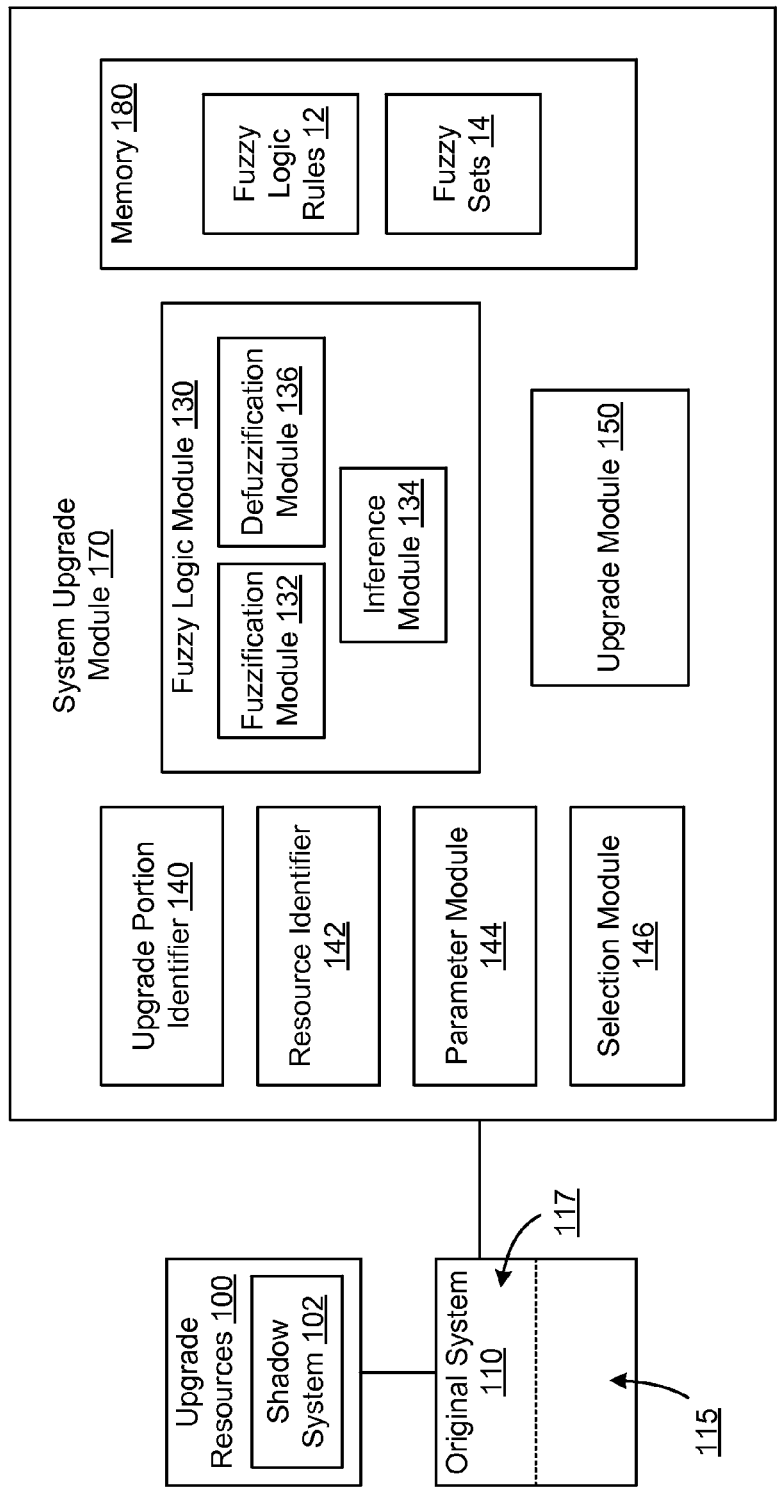
FIG. 1 is a block diagram that illustrates a system upgrade module configured to facilitate an upgrade of an original system using upgrade resources and based on fuzzy logic.

FIG. 1 is a block diagram that illustrates a system upgrade module 170 configured to facilitate an upgrade of an original system 110 using upgrade resources 100 and based on fuzzy logic. The upgrade resources 100 can be used to define an environment within which certain operations of an upgrade process can be performed so that the original system 110 can operate in an active mode (e.g., remain in an upstate, continue in a normal operational environment) during the upgrade process. In some embodiments, the original system 110 can be a stand-alone device and/or module, a server, a network, a data center, a software and/or hardware system, a virtual system, a system (e.g., an SAP system) defined based on Advanced Business Application Programming (ABAP), and/or so forth.

In this embodiment, target-upgrade portions 115 of the original system 110 are identified (e.g., scheduled) for upgrade during an upgrade process. The target-upgrade portions 115 of the original system 110 that are identified for upgrade can include, for example, one or more databases (e.g., program databases, customer databases), one or more executable files, and/or so forth. In some embodiments, the portions 115 of the original system 110 that are identified for upgrade can be referred to as upgrade portions. If the target-upgrade portions 115 of the original system 110 are databases, the structure and/or content of the target-upgrade portions 150 can be upgraded during an upgrade process.

In some embodiments, the upgrade resources 100 can be processing resources, storage resources (e.g., memory resources), and/or so forth. In this embodiment, the upgrade resources 100 can be used, during an upgrade process, to operate (e.g., produce, store) a shadow system 102 that includes one or more portions (e.g., databases, executable files) that correspond with at least some of (e.g., databases, executable files) the target-upgrade portions 115 of the original system 110. The portions of the shadow system 102 that correspond with the target-upgrade portions 115 of the original system 110 can be referred to as corresponding portions. In some embodiments, the portions of the shadow system 102 that correspond with the target-upgrade portions 115 of the original system 110 can be upgraded versions (e.g., modified versions) or exact copies of the target-upgrade portions 115 of the original system 110. Portions of the upgrade process of the original system 110 can be performed on the corresponding portion(s) of the shadow system 102 while the original system 110 operates in an active mode. The corresponding portions of the shadow system 102, after being upgraded, can later be copied into (and replace portions of) the original system 110.

By performing certain portions of the upgrade process using the upgrade resources 100 (e.g., using the shadow system 102 operating within the upgrade resources 100) rather than directly on the original system 110, the duration of the downtime of the original system 110 can be shorter than if certain portions of the upgrade process are performed directly on the original system 110. In some embodiments, the downtime of the original system 110 during an upgrade process can be minimized by performing certain portions of the upgrade process in the shadow system 102 of the upgrade resources 100. In some embodiments, the shadow system 102 can be referred to as a shadow system because portions of the shadow system 102 can mirror (or shadow) certain portions of the target-upgrade portions 115 of the original system 110.

Throughout this detailed description the terms up/upstate and down/downstate will be used to describe a functional state of a system (e.g., a shadow system operating within the upgrade resources 100, the original system 110), while the terms uptime and downtime will be used to describe the accessibility of the system by one or more users (while in a functional state). Thus, a system can only be operating during uptime (and be accessible by a typical user) when the system is also up (e.g., in an upstate), but a system can have downtime (and may be partially or completely inaccessible by a typical user) when the system is also up (e.g., in an upstate).

During an upgrade process the upgrade resources 100, which can include memory space and/or processing resources for use during the upgrade process, may be limited. The upgrade resources 100 may be limited based on an allocation of resources to the upgrade resources 100 by, for example, a user (e.g., an administrator) handling the upgrade of the original system 110.

Because the upgrade resources 100 may be limited, only some portions of the target-upgrade portions 115 of the original system 110 (that are identified/scheduled for upgrade), such as only some portions of the databases of the original system 110, may be processed as part of the shadow system 102 within the upgrade resources 100 during uptime of the original system 110. The remaining portions of the target-upgrade portions 115 of the original system 110 that are not processed as part of the shadow system 102 may instead be upgraded during downtime of the original system 110. Thus, portions of the original system 110 that are identified for upgrade but are not selected for processing as part of the shadow system 102 can result in an increase in downtime of the original system 110.

The system upgrade module 170 includes an upgrade portion identifier 140 configured to identify which portions (i.e., the target-upgrade portions 115) of the original system 110 are identified (e.g., targeted) for upgrade during an upgrade process. In some embodiments, the target-upgrade portions 115 of the original system 110 that are identified for upgrade can be selected by (e.g., designated by), for example, an administrator. In some embodiments, the target-upgrade portions 115 of the original system 110 can be identified for upgrade based on support package upgrades, upgrade versions, and/or so forth associated with the target-upgrade portions 115. In some embodiments, the upgrade portion identifier 140 can be configured to receive and process a list identifying the target-upgrade portions 115 of the original system 110 that are identified (e.g., scheduled) for upgrade.

The system upgrade module 170 is configured to select at least a portion of the target-upgrade portions 115 of the original system 110 (e.g., databases of the original system 110) for processing as part of the shadow system 102 within the upgrade resources 100 during an upgrade process. Specifically, the system upgrade module 170 is configured to determine, using fuzzy logic, which portions of the target-upgrade portions 115 of the original system 110 (that are identified for upgrade) should be processed as part of the shadow system 102 based on a combination of the availability of the upgrade resources 100 (e.g., space available within the upgrade resources 100) and parameter values associated with the target-upgrade portions 115 of the original system 110 that are identified for upgrade. It follows that the system upgrade module 170 is configured to determine, using fuzzy logic, which portions of the target-upgrade portions 115 of the original system 110 that are not to be processed as part of the shadow system 102 based on a combination of the availability of the upgrade resources 100 (e.g., space available within the upgrade resources 100) and parameter values associated with the target-upgrade portions 115 of the original system 110. Thus, only a subset of the target-upgrade portions 115 of the original system 110 may be selected, at least in part, for processing within the upgrade resources 100 because of, for example, limitations of (e.g., a lack of availability of) the upgrade resources 100.

The system upgrade module 170 includes a resource identifier 142 configured to identify the upgrade resources 100 that are available (e.g., available for use as part of a shadow system 102) during an upgrade process. The resource identifier 142 can be configured to quantify the availability of the upgrade resources 100. In some embodiments, the resource identifier 142 can be used by a user to define the upgrade resources 100 to be used during an upgrade process. If the upgrade resources 100 include memory (e.g., physical memory, disk space), the availability of the upgrade resources 100 can be represented by an amount of memory available. If the upgrade resources 100 are processors, the availability of the upgrade resource 100 can be represented by a number of processors or an available processing time and/or processing cycles.

The parameter values used by the system upgrade module 170 to select portions of the original system 110 for processing within the upgrade resources 100 can be determined by a parameter module 144. The parameter module 144 can determine the parameter values of the portion(s) of the original system 110 identified for upgrade based on, for example, a list of the portion(s) identified for upgrade as identified by the upgrade portion identifier 140.

The parameter values used by the system upgrade module 170 to select portions of the original system 110 for processing within the upgrade resources 100 can include, or can represent, for example, a size (e.g., a number of megabytes (MB)), an import size, a projected (e.g., anticipated) structural adjustment, and/or so forth. Assuming that the target-upgrade portions 115 are identified (e.g., scheduled) for upgrading and can potentially be selected, the size can be a size of data (e.g., customer data) included in one or more of the target-upgrade portions 115. The import size can be a size of data (e.g., a program file, a predefined user template, master data, configuration data, and/or so forth) associated with (e.g., configured to operate on, to be installed as part of the upgrade of) the portion of the original system 110 potentially selected for processing within the upgrade resources 100 during the upgrade process. In other words, the data associated with an import can be data that is loaded (e.g., installed) in conjunction with an upgrade process of, for example, a database.

The system upgrade module 170 is configured to balance the availability of the upgrade resources 100 and parameter values associated with portions of the original system 110 identified for upgrade so that the downtime of the original system 110 can be optimized. Specifically, the system upgrade module 170 is configured to select the portions of the original system 110 for processing as part of the shadow system 102 using fuzzy logic (e.g., a fuzzy logic process, a fuzzy logic algorithm) implemented by a fuzzy logic module 130. Although examples of fuzzy logic processes are described below in connection with fuzzy logic module 130, a variety of fuzzy logic processes can be used by the fuzzy logic module 130 of the system upgrade module 170.

The fuzzy logic module 130 includes a fuzzification module 132, an inference module 134, and a defuzzification module 136. The fuzzification module 132 is configured to perform fuzzification (e.g., a fuzzification process, a fuzzification portion of a fuzzy logic process), the inference module 134 is configured to perform inference (e.g., a inference process, an inference portion of a fuzzy logic process), and the defuzzification module 136 is configured to perform defuzzification (e.g., a defuzzification process, a defuzzification portion of a fuzzy logic process).

In some embodiments, the input values into the fuzzy logic module 130 can be the parameter values (which can be defined by the parameter module 144) associated with each of the target-upgrade portions 115 of the original system 110. In some embodiments, the output values of the fuzzy logic module 130 are results (also referred to as a real values or as a relevance coefficients) associated with each of the target-upgrade portions 115. In some embodiments, the result can be used to rank order the target-upgrade portions 115, and the rank-ordered results can be used by the selection module 146, in conjunction with the limitations of the upgrade resources 100, to select the portions (not shown) of the target-upgrade portions 115 to be processed within the upgrade resources 100. In some embodiments, the input values (e.g., the parameter values) and/or the output values (e.g., the results) can be communicated with the fuzzy logic module 130 using one or more protocols such as an XML-based protocol.

As a specific example, the upgrade resources 100 may include a hundred gigabytes of memory (e.g., physical memory, disk space) where portions of the original system 110 (e.g., target-upgrade portions 115 of the original system 110) may be processed as part of the shadow system 102 during an uptime of the original system 110. The target-upgrade portions 115 of the original system 110 may include databases that are targeted for upgrade. The databases that are targeted for upgrade can be identified by the upgrade portion identifier 140, and the amount of memory available within the upgrade resources 100 can be identified by the resource identifier 142. The parameter module 144 can be configured to calculate parameter values associated with the databases that are targeted for upgrade. The fuzzy logic module 130 can receive the parameter values and can be configured to calculate, based on a fuzzy logic process, a result for each of the databases that can be used to rank order the databases. The selection module 146 can be configured to designate the databases in the rank ordered list, starting from the highest ranking, that consume the hundred gigabytes of memory of the upgrade resources 100 as the databases for processing within the upgrade resources 100 (as part of the shadow system 102) during uptime of the original system 110. The remaining databases in the rank-ordered list (which do not fit in the hundred gigabytes of memory), if any, may be processed during a downtime of the original system 110. If additional space is allocated as part of the upgrade resources 100, additional databases (based on rank order) can be processed within the upgrade resources 100 during uptime of the original system 110, resulting in less downtime of the original system 110. Details of operations performed by the fuzzy logic module 130 using a fuzzy logic process to calculate result associated with the target-upgrade portions 115 are set forth below.

The fuzzification module 132 of the fuzzy logic module 130 is configured to use the parameter values associated with the target-upgrade portions 115 (e.g., databases) of the original system 110 to determine a degree that each of the target-upgrade portions 115 is included in one or more fuzzy sets 14 during fuzzification. In some embodiments, the parameter values associated with the target-upgrade portions 115 of the original system 110 are normalized as normalized parameter values that can then be used to determine a degree (e.g., a percentage) that each of the target-upgrade portions 115 is included in one or more fuzzy sets 14.

The degree of membership (e.g., degree of inclusion) of each of the target-upgrade portions 115 (e.g., databases) within the fuzzy sets can be used to determine which of a set of fuzzy logic rules 12 should be used for inference. The fuzzy logic rules 12 can include IF-THEN rules that are each combinations of linguistic variables (e.g., ImportSize, DatabaseSize, SizeRatio, DatabaseValue) that can each represent a fuzzy set and linguistic terms (e.g., small, medium, large, and high) that can each characterize a particular fuzzy set. In some embodiments, the fuzzy logic rules 12 can be different logical constructs such as fuzzy associative matrices. In some embodiments, the fuzzy logic rules 12 can represent membership combinations of each of the target-upgrade portions 115 within the fuzzy sets 14. For example, a database included in the target-upgrade portions 115 can be included in a combination of fuzzy sets 14. The membership of the database within the fuzzy sets 14 can be represented by one or more fuzzy logic rules 12 such as "IF ImportSize IS large AND DatabaseSize IS small AND SizeRatio IS medium THEN DatabaseValue IS high."

Each combination of linguistic variable and linguistic term (which represents a fuzzy set) can be referred to as a premise of the fuzzy logic rule. For example, the phrase "IF ImportSize IS large" from the logical rule example cited above can be referred to as a premise. The term "THEN DatabaseValue IS high" can be referred to as a conclusion of the fuzzy logic rule. In some embodiments, one or more of the fuzzy logic rules 12 can include an unlimited number of combinations of linguistic variables and linguistic terms (which collectively define premises). Examples of fuzzy sets are described in connection with FIGS. 4 through 6, and examples of fuzzy logic rules are described in connection with FIG. 7.

Inference performed by the inference module 134 of the fuzzy logic module 130 can include an aggregation process, an implication process, and an accumulation process. The aggregation process, implication process, and accumulation process can be based on (e.g., can use) the fuzzy logic rules 12 and the fuzzy sets 14 that are associated with each of the target-upgrade portions 115. The aggregation, implication, and accumulation processes can be performed using various methods including the Mamdani method, the Larsen method, and/or the Mizumoto method. The fuzzy operators (e.g., union operator, intersection operator, complement operator) used in conjunction with each of these methods can characterize the differences between these methods.

During the aggregation process of the inference performed by the inference module 134, the premises of each of the fuzzy logic rules 12 associated with the target-upgrade portions 115 are aggregated. Specifically, a truth-value is calculated based on the aggregated premises using a fuzzy operator. During the implications process, the truth-value of the conclusion of each of the fuzzy logic rules 12 associated with the target-upgrade portions 115 are calculated using the truth-value of the aggregated premises and the fuzzy operator.

For example, if using the intersection operator, all membership degrees associated with the fuzzy sets 14 (and the fuzzy logic rules 12) can be set to the minimum of all truth-values of the premise. If using the product operator, the product operator can be used to multiply all membership degrees associated with the fuzzy sets 14 (and the fuzzy logic rules 12) with the truth-value of the corresponding premises. If using the Mamdani-Operator the truth-value of the conclusion may not be larger than the truth-value of the corresponding premises.

During the accumulation process, all of the fuzzy sets 14 associated with each of the target-upgrade portions 115 of the original system 110 are combined into a single fuzzy set for each of the target-upgrade portions 115. Accordingly, after the accumulation process, each of the target-upgrade portions 115 can be associated with a single fuzzy set. The fuzzy sets 14 associated with each of the target-upgrade portions 115 can be combined using one or more accumulation operators (e.g., maximum operators, bounded sum operators).

During defuzzification performed by the defuzzification module 136 of the fuzzy logic module 130, the single fuzzy set for each of the target-upgrade portions 115 determined during the inference portion of the fuzzy logic process by the inference module 134 are used to calculate (e.g., are converted into) a result (also referred to as a real value or as a relevance coefficient). In some embodiments, various types of defuzzification methods can be used, for example, a basic defuzzification distribution (BADD) method, an extended center of area (ECOA) method, a mean of maxima (MeOM) method, a center-of-gravity (COA) defuzzification method, and/or so forth, can be used to calculate the result. As mentioned above, in some embodiments, the result can be used to rank order the target-upgrade portions 115, and the rank-ordered results can be used by the selection module 146, in conjunction with information about the limitations of the upgrade resources 100, to select the portions (not shown) of the target-upgrade portions 115 to be processed within the upgrade resources 100. FIGS. 3 through 7 illustrate a specific example of a fuzzy logic process performed on a set of databases using, for example, the fuzzy logic module 130 shown in FIG. 1.

In some embodiments, the fuzzy logic module 130 (or portions thereof) can be based on Fuzzy Control Language (FCL), which is a procedural language for a fuzzy-controller. In some embodiments, the fuzzy logic module 130 can operate using an FCL control file for the fuzzy controller. The FCL control file can define the fuzzy sets 14, linguistic variables, fuzzy logic rules 12, parameter values, and/or so forth. In some embodiments, the fuzzy logic module 130 can be based on a different programming language than FCL.

In some embodiments, the selection of portions of the target-upgrade portions 115 of the original system 110 for processing as part of the shadow system 102 (within the upgrade resources 100 and during uptime of the original system 110) can be performed during an upgrade process, but before actual upgrading of the target-upgrade portions 115 is performed (e.g., commenced) by an upgrade module 150. In some embodiments, the time period during which selection of the portions of the target-upgrade portions 115 occurs can be referred to as an upgrade preparation time period, a configuration phase, or as a upgrade selection time period. In some embodiments, the selection of portions of the target-upgrade portions 115 for processing as part of the shadow system 102 can be dynamically performed while upgrading of the target-upgrade portions 115 is being performed by the upgrade module 150.

In some embodiments, the shadow system 102 (or portions thereof) operating within the upgrade resources 100 can be defined specifically for use during the upgrade process. Specifically, the shadow system 102 can be a temporary system created for use during upgrade of the original system 110. After the original system 110 (e.g., the target-upgrade portions 115 of the original system 110) has been upgraded, the shadow system 102 and/or logs associated with the shadow system 102 can be dismantled and/or expunged.

In some embodiments, while corresponding portions of the target upgrade portions 115 are being processed within the shadow system 102, the target upgrade portions 115 can be changed within the original system 110, which is operating in parallel with the shadow system 102. In some embodiments, changes to the target-upgrade portions 115 of the original system 110 that are selected for and mirrored in the shadow system 102 as corresponding portions can be ignored and later overwritten with the corresponding portions within the shadow system 102. In some embodiments, changes to the target-upgrade portions 115 of the original system 110 that occur while corresponding portions are being processed in the shadow system 102 can be recorded and copied into the corresponding portions of the shadow system 102. In some embodiments, if changes to the target-upgrade portions 115 of the original system 110 occur while corresponding portions (which are selected and mirrored from the target-upgrade portions 115) are being processed in the shadow system 102, the corresponding portions of the shadow system 102 can be discarded.

In some embodiments, the shadow system 102 (and the upgrade resources 100) and the original system 110 can both configured to operate within a common set of hardware (e.g., a common set of servers, a common network) and in a common environment (e.g., a common platform), but are operating within different partitions. In some embodiments, the upgrade resources 100 and original system 110 may not be operating in different partitions. Although not shown, in some embodiments, portions of the upgrade resources 100 and/or portions of the original system 110 can be defined so that they operate within different sets of hardware and/or in different environments. In some embodiments, the upgrade resources 100 can be implemented as a virtual system (e.g., as a virtual machine).

In some embodiments, the original system 110 (e.g., the target-upgrade portions 115 of the original system 110) can include original program databases and original user databases (not shown). The original user databases can include data defined by the owner of the original system 110. For example, the original user databases can include user-specific data such as business data, financial data, and/or so forth. In some embodiments, the data stored within the original user databases can be referred to as customer data. In some embodiments, the original user databases can be referred to as customer databases. In some embodiments, the original user databases can include, or can be, more than one database. The original program databases can include, or can be, for example, data (e.g., configuration data) associated with a program of the original system 110. In some embodiments, the data stored within the original program databases can be referred to as system data. If the original system 110 is an ABAP-based SAP system, the original program databases can be ABAP repository tables.

In some embodiments, the original program databases can be associated with executable files (e.g., a set of executable files) (not shown). The original program databases associated executable files can collectively define at least a portion of an original program (not shown). In some embodiments, the executable files can define at least a portion of the kernel associated with an operating system of the original system 110. In other words, in some embodiments, the original program can include a database component (i.e., the original program databases) and an executable file component. Thus, the original program databases can be associated with one or more executable files. In some embodiments, the original program databases can include, or can be, for example, configuration data associated with the executable files. In some embodiments, configuration data can include program instructions associated with the executable files. In other words, the original program databases can describe, or can include, data associated with the functionality of the executable files. In some embodiments, the executable files and/or the original program databases can collectively be configured to operate on the original user databases. In other words, the executable files and/or the original program databases can have functionality related to the original user databases.

The databases and/or programs described herein can be defined based on a structure, and the structure can include data. In other words, the databases and/or programs described herein can have a structural component and a data component. The structural component can be associated with the data component, and vice versa. The structure of a database (such as the original program databases and/or the original user databases) can be defined by rows and/or columns. The data stored in the database can be divided into fields by the structure of the database. For example, a field of a database can be at an intersection of a row of the database and at a column of the database, and can include a portion of data. In some embodiments, the one or more of the databases described herein can be, for example, an Oracle database, a DB2 database, and/or so forth. In some embodiments, the databases discussed herein can be referred to as repositories. In some embodiments, a database that includes many databases can be referred to in a singular fashion as a database. In some embodiments, individual databases within a database can be referred to as portions of the database.

During downtime of the original system 110, one or more portions of the original system 110 may not accessible by a typical user. However, the upgrade resources 100 and/or the original system 110 may be accessible by, for example, an administrator when the upgrade resources 100 are in a downstate and/or during downtime of the original system 110. For example, when the original system 110 is in a downstate during downtime of the original system 110, data from the original user databases of the original system 110 may not be accessed by a user of the original system 110. Instead, the original user databases may be locked so that data cannot be retrieved from and/or stored to the original user databases.

During uptime of the original system 110, one or more portions of the original system 110 may be accessible by a typical user in a typical operational mode. In other words, the original system 110 may be actively used during uptime. For example, when the original system 110 is in an upstate during uptime of the original system 110, data from the original user databases of the original system 110 may accessed (e.g., modified) by a user of the original system 110.

In some embodiments, the upgrade module 150 can be configured to suspend one or more batch jobs of the original system 110 when (e.g., before) a downtime of the original system 110 is initiated. In some embodiments, the upgrade module 150 can be configured to log-off one or more user from the original system 110 before a downtime of the original system 110 is initiated.

Portions (e.g., steps) of an upgrade process can be performed when the upgrade resources 100 and/or the original system 110 are in an upstate or in a downstate. In other words, portions of the upgrade process can be performed by the upgrade module 150 during various portions of the upstate or downstate of the upgrade of the upgrade resources 100 and/or the original system 110.

The system upgrade module 170 can be, or can be included within, for example, a client device and/or a server device. In some embodiments, the system upgrade module 170 can be, or can be included within, for example, a wired device and/or a wireless device (e.g., wi-fi enabled device) and can be, for example, a computing entity (e.g., a personal computing device), a mobile phone, a personal digital assistant (PDA) and/or so forth. The system upgrade module 170 can be configured to operate based on one or more platforms (e.g., one or more similar or different platforms) that can include one or more types of hardware, software, firmware, operating systems, runtime libraries, and/or so forth. In some embodiments, the system upgrade module 170 can be defined using ABAP and/or can be related to a NetWeaver platform.

Although not shown, in some embodiments, the memory 180 can be implemented as more than one memory component (e.g., more than one random-access memory (RAM) component or disk drive memory) within the system upgrade module 170. In some embodiments, the memory 180 can be, or can include, a non-local memory (e.g., a memory not physically included within the system upgrade module 170) within a network (not shown). For example, the memory 180 can be, or can include, a memory shared by multiple system upgrade modules (not shown) within a network.

Although not shown, the system upgrade module 170 can be configured to operate within an environment that includes an operating system. In some embodiments, the operating system can be configured to facilitate the functions of the system upgrade module 170.

In some embodiments, the system upgrade module 170 can represent, or can be included within, a cluster of modules/devices. In such an embodiment, the functionality and processing of the system upgrade module 170 (e.g., the fuzzy logic module 130 of the system upgrade module 170) can be distributed to several modules/devices of the cluster of modules/devices.

In some embodiments, one or more portions of the components shown in the system upgrade module 170 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the fuzzy logic module 130 can be, or can include, a software module configured for execution by at least one processor (not shown). In some embodiments, the functionality of the components can be included in different modules and/or components than those shown in FIG. 1. For example, although not shown, the functionality of the fuzzy logic module 130 can be included in a different module, or divided into several different modules (not shown).

In some embodiments, the system upgrade module 170, the upgrade resources 100, and/or the original system 110 can be included within a network that can include multiple devices (e.g., multiple client devices, multiple server devices). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet. Also, although not shown in FIG. 1, the system upgrade module 170 can be configured to function within various types of network environments.

Figure 2:
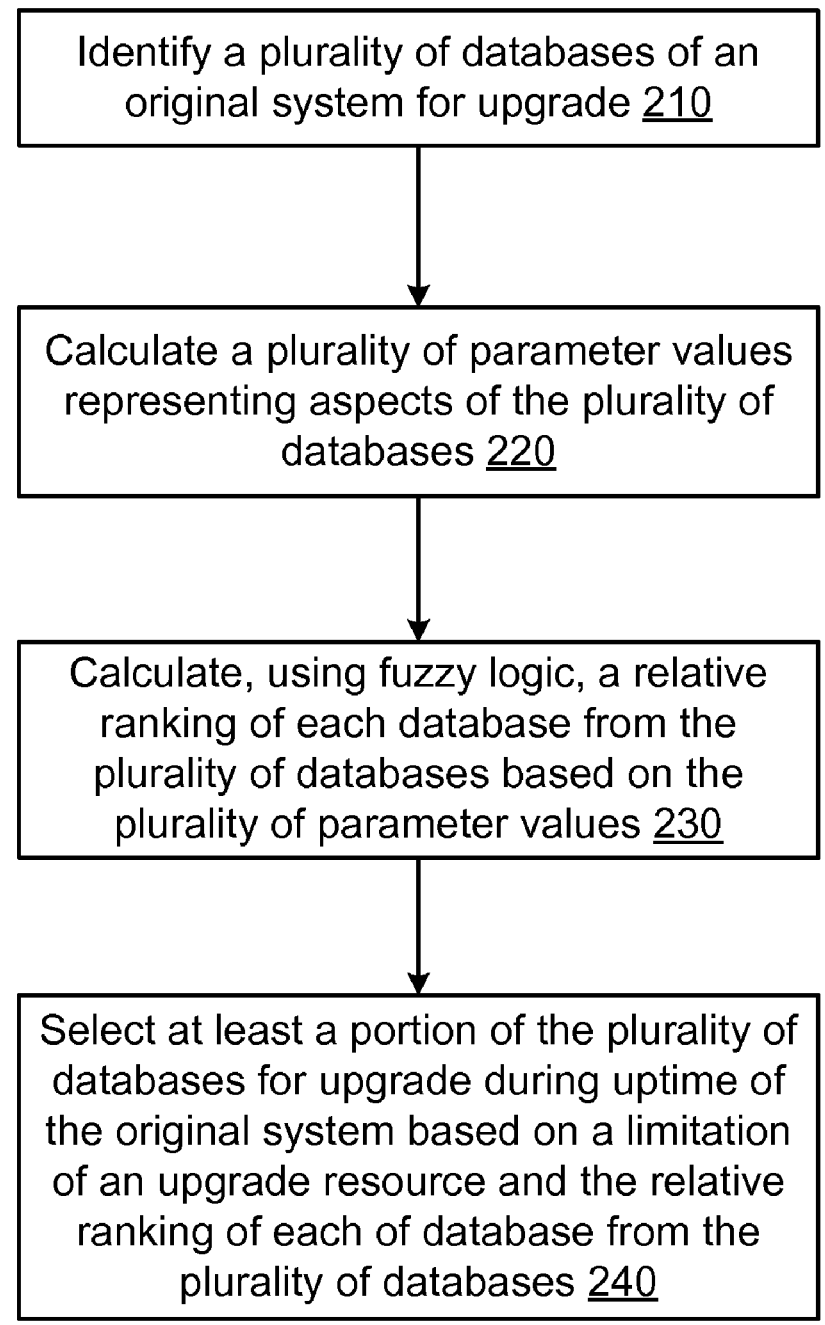
FIG. 2 is a flowchart that illustrates a method for upgrading the original system based on fuzzy logic.

FIG. 2 is a flowchart that illustrates a method for upgrading the original system based on fuzzy logic. In some embodiments, portions of the flowchart can be implemented by, for example a system upgrade module such as the system upgrade module 170 shown in FIG. 1.

As shown in FIG. 2, a plurality of databases of an original system is identified for upgrade (block 210). In some embodiments, an upgrade portion identifier (e.g., the upgrade portion identifier 140 shown in FIG. 1) can be configured to identify the plurality of databases of an original system for upgrade. In some embodiments, the plurality of databases of the original system that is identified for upgrade can be referred to as target-upgrade portions. In some embodiments, the plurality of databases can be identified based on a list of the databases scheduled for upgrade during an upgrade process.

A plurality of parameter values representing aspects of the plurality of databases are calculated (block 220). In some embodiments, a parameter module (e.g., the parameter module 144 shown in FIG. 1) can be configured to calculate the plurality of parameter values representing aspects of the plurality of databases. In some embodiments, the plurality parameter values can include a size parameter value, and import size parameter value, and/or so forth. The parameter values can be used as an input values for a fuzzy logic process.

A relative ranking of each database from the plurality of databases is calculated based on the plurality of parameter values using fuzzy logic (block 230). In some embodiments, a fuzzy logic module (e.g., the fuzzy logic module 130 shown in FIG. 1) can be configured to calculate, using fuzzy logic, the relative ranking of each database from the plurality of databases based on the plurality of parameter values. In some embodiments, the fuzzy logic can be based on a fuzzification process, an inference process, and/or a defuzzification process. The inference process can include an aggregation process, an implication process, and/or an accumulation process.

At least a portion of the plurality of databases are selected for upgrade during uptime of the original system based on a limitation of an upgrade resource and the relative ranking of each of database from the plurality of databases (block 240). In some embodiments, a selection module (e.g., the selection module 146 shown in FIG. 1) can be configured to select the at least the portion of the plurality of databases for upgrade during uptime of the original system based on the limitation of the upgrade resource and the relative ranking of each of database from the plurality of databases. In some embodiments, the at least a portion of the plurality of databases are selected for upgrade within a shadow system implemented within the upgrade resource.

FIGS. 3 through 7 illustrate a specific example of a fuzzy logic process performed on a set of databases using, for example, the fuzzy logic module 130 shown in FIG. 1. Specifically, FIG. 3 is a database 300 that illustrates fuzzy logic input and output values processed by a fuzzy logic module and related to target upgrade databases 310 of an original system. The original system can be similar to, or the same as, the original system 110 shown in FIG. 1. The target upgrade databases 310 can be, for example, from the target-upgrade portions 115 of the original system 110. As shown in FIG. 3, the target upgrade databases 310 include databases QA through QC. The fuzzy logic values in database 300 can be produced by, for example, the system upgrade module 170 shown in FIG. 1. Specifically, the database 300 includes parameter values 320 and normalized parameter values 330 that can function as input values into a fuzzy logic module (e.g., fuzzy logic module 130 shown in FIG. 1). The database 300 also includes fuzzy set membership values 340 that can be calculated (e.g., determined) by the fuzzy logic module, and result values 350 that can function as output values from the fuzzy logic module.

Parameter values 320 are included in the database 300 for each of the target upgrade database 310. The parameter values 320 include a database size parameter value 322, an import size parameter value 324, and a ratio value 326. The ratio value 326 represents a ratio of the database size (shown in column 322) to the import size (shown in column 324). For example, the database QB has a database size in kilobytes (KB) of 216,432 (shown in column 322), an import size of 4,519,860 KB (shown in column 324), and a ratio of 21 (shown in column 326). In some embodiments, the parameter values 320 can be determined by, for example, the parameter value module 144 shown in FIG. 1.

Normalized parameter values 330 are determined (e.g., calculated) for each of the target upgrade databases 310. The normalized parameter values 330 correspond with each of the parameter values 320 shown in FIG. 3. The normalized parameter value SLOG 332 is calculated using Log10(Database Size/Max(Database Size)), the normalized parameter value ILOG 334 is calculated using Log10(Import Size/Max (Import Size)), and the lies parameter value RLOG 336 is calculated using Log10(Import Size/Database Size). For example, the database QA has a normalized parameter value SLOG of −4.1 (shown in column 332), a normalized parameter value ILOG of −2.9 (shown in column 334), and a normalized parameter value RLOG of 2.5 (shown in column 336). In some embodiments, the normalized parameter values 330 can be determined by, for example, the parameter value module 144 shown in FIG. 1.

In this embodiment, the fuzzy set membership values 340 can be determined (e.g., calculated) based on representations of fuzzy sets. In this embodiment, the fuzzy set membership values 340 include a database size membership values 342 (represented by "S Class"), and import size membership values 344 (represented by "I Class"), and a ratio membership values 346 (represented by "R Class"). In this embodiment, the fuzzy sets are graphically represented in FIGS. 4 through 6, and the fuzzy set membership values 340 can be graphically determined using the normalized parameter values 330. In some embodiments, the fuzzy sets can be represented using one or more equations and/or algorithms.

Figure 4:
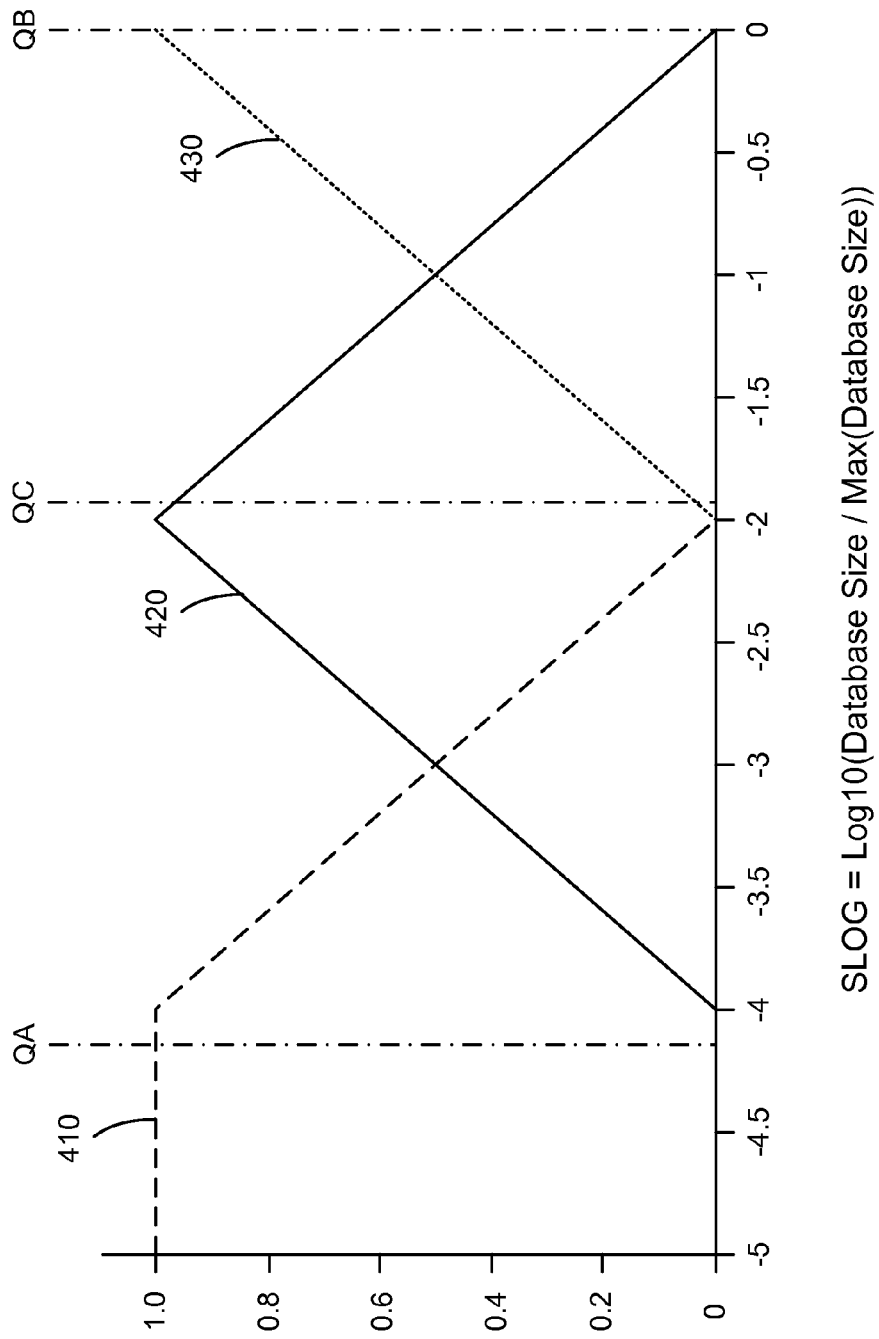
FIG. 4 is a graph that illustrates fuzzy sets related to database size.

FIG. 4 is a graph that illustrates fuzzy sets related to database size. Specifically, the graph includes a fuzzy set related to a small-size database 410 (represented by a dashed line), a fuzzy set related to a medium-size database 420 (represented by solid line), and a fuzzy set related to a large-size database 430 (represented by a dotted line). In this graph, SLOG values are along the x-axis and membership values (scaled from 0 to 1) are along the y-axis.

Using this graph, the database size membership values 342 shown in FIG. 3 can be determined. For example, at an SLOG value of −4.1 (shown in column 332 of FIG. 3), the database QA has a membership value of 1.0 (shown in FIG. 4) entirely in the small database size fuzzy set (represented as "1.0S" in column 342 of FIG. 3). As another example, at an SLOG value of −1.86 (shown in column 332 of FIG. 3), the database QC has a membership value of 0.93 in the medium database size fuzzy set (shown in FIG. 4 along solid line 420) and a membership value of 0.03 in the large database size fuzzy set (shown in FIG. 4 along dotted line 430). The split (or partial) membership of the database QC in the medium database fuzzy set and the large database fuzzy set is represented as "0.93M/0.03L" in column 342 of FIG. 3. This database size represents that the database QC has a database size that is associated more with a medium database size than with a large database size.

Figure 5:
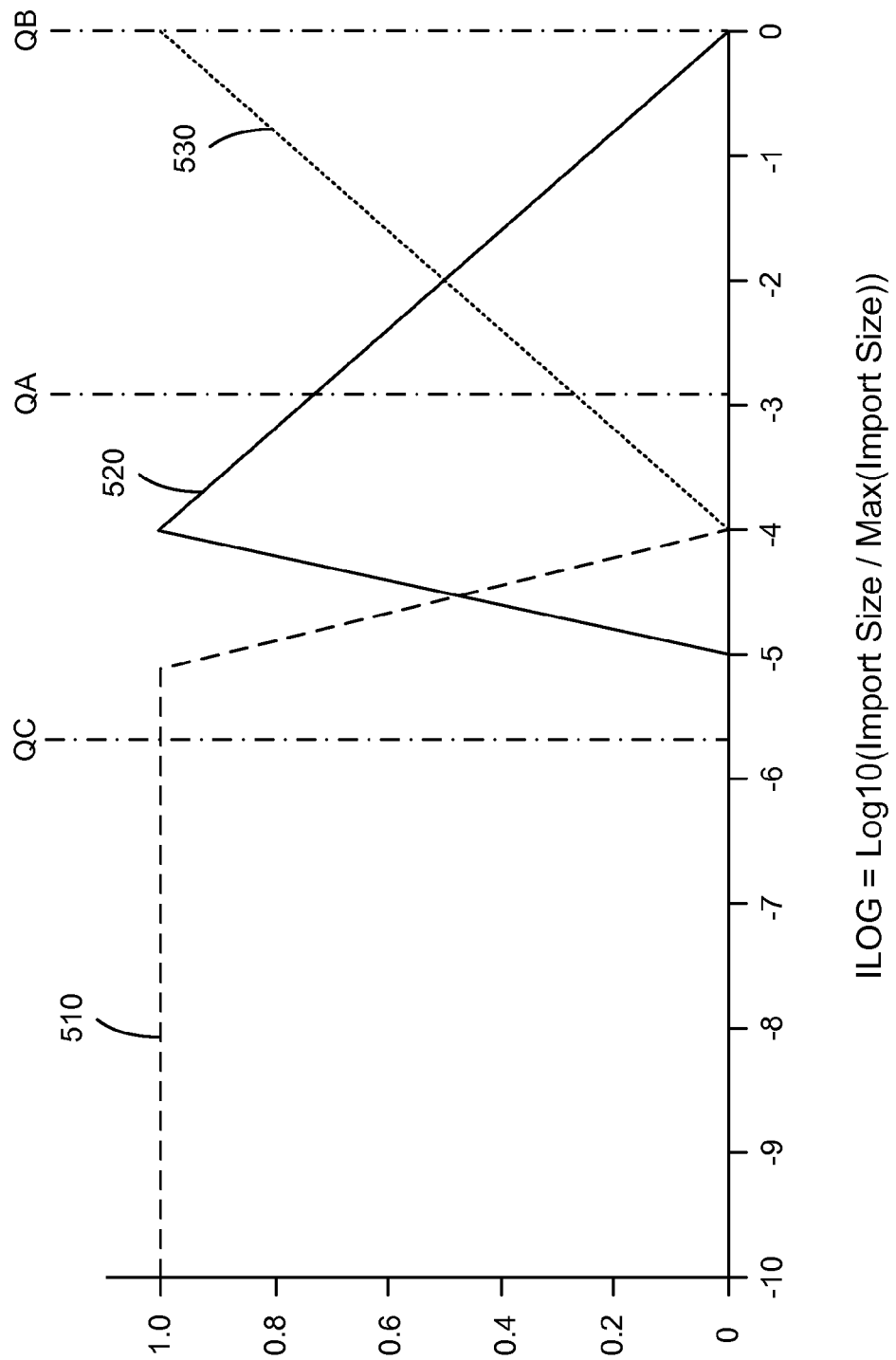
FIG. 5 is a graph that illustrates fuzzy sets related to import size.

FIG. 5 is a graph that illustrates fuzzy sets related to import size. Specifically, the graph includes a fuzzy set related to a small import size database 510 (represented by a dashed line), a fuzzy set related to a medium import size database 520 (represented by solid line), and a fuzzy set related to a large import size database 530 (represented by a dotted line). In this graph, ILOG values are along the x-axis and membership values (scaled from 0 to 1) are along the y-axis.

Using this graph, the import size membership values 344 shown in FIG. 3 can be determined. For example, at an ILOG value of 0 (shown in column 334 of FIG. 3), the database QB has a membership value of 1.0 (shown in FIG. 5) entirely in the large import size fuzzy set (represented as "1.0L" in column 344 of FIG. 3). As another example, at an ILOG value of −2.9 (shown in column 334 of FIG. 3), the database QA has a membership value of 0.75 in the medium import size fuzzy set (shown in FIG. 5 along solid line 520) and a membership value of 0.25 in the large import size fuzzy set (shown in FIG. 5 along dotted line 530). The split (or partial) membership of the database QA in the medium database fuzzy set and the large database fuzzy set is represented as "0.75M/0.25L" in column 344 of FIG. 3. This import size represents that the database QA has an import size that is associated more with a medium import size than with a large import size.

Figure 6:
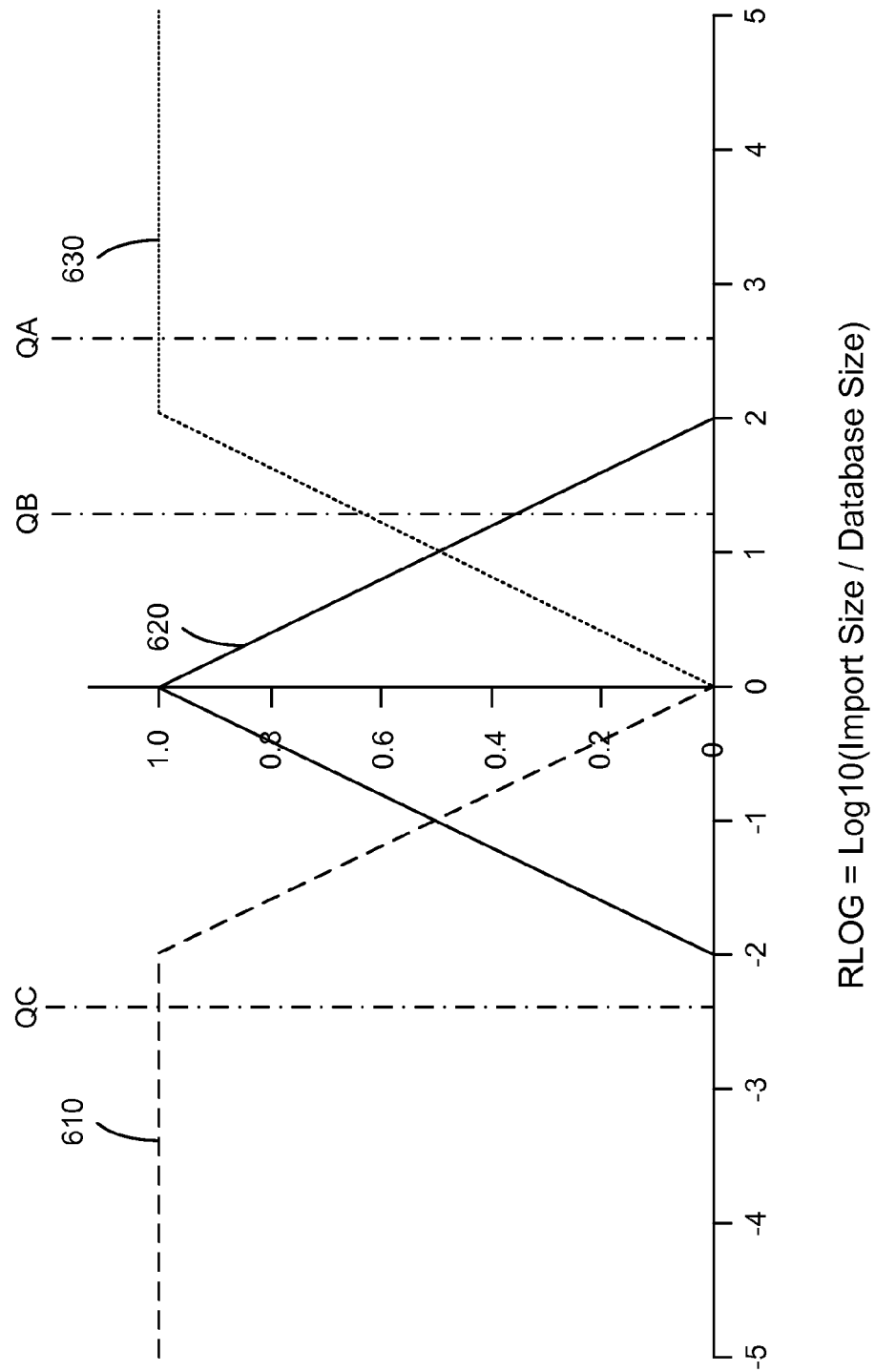
FIG. 6 is a graph that illustrates fuzzy sets related to a ratio of a database size and an import size.

FIG. 6 is a graph that illustrates fuzzy sets related to a ratio of a database size and an import size. Specifically, the graph includes a fuzzy set related to a small ratio 610 (represented by a dashed line), a fuzzy set related to a medium ratio 620 (represented by solid line), and a fuzzy set related to a large ratio 630 (represented by a dotted line). In this graph, RLOG values are along the x-axis and membership values (scaled from 0 to 1) are along the y-axis.

Using this graph, the ratio membership values 346 shown in FIG. 3 can be determined. For example, at an RLOG value of 2.5 (shown in column 336 of FIG. 3), the database QA has a membership value of 1.0 (shown in FIG. 6) entirely in the large ratio fuzzy set (represented as "1.0L" in column 344 of FIG. 3). As another example, at an ILOG value of 1.32 (shown in column 336 of FIG. 3), the database QB has a membership value of 0.37 in the medium ratio fuzzy set (shown in FIG. 6 along solid line 620) and a membership value of 0.63 in the large ratio fuzzy set (shown in FIG. 6 along dotted line 630). The split (or partial) membership of the database QB in the medium database fuzzy set and the large database fuzzy set is represented as "0.37M/0.63L" in column 346 of FIG. 3. This ratio represents that the database QB has a ratio that is associated more with a large ratio than with a medium ratio.

FIG. 7 is a diagram that illustrates fuzzy logic rules 700, according to an embodiment. As shown in FIG. 7, each of the rules has at least one premise 710 and each has at least one conclusion 720. As shown in FIG. 7, the fuzzy logic rules 700 each include linguistic variables (e.g., ImportSize, DatabaseSize, SizeRatio, DatabaseValue) that can each represent a fuzzy set and linguistic terms (e.g., small, medium, large, and high).

The fuzzy logic rules 700 shown in FIG. 7 can be associated with the target upgrade databases 310 shown in FIG. 3 using the fuzzy set membership values 340 shown in FIG. 3. For example, because database QB has a database size membership value 342 of large, an import size membership value 344 of large, and a ratio membership value 346 of medium and large, rule 2 and rule 3 each apply to database QB.

Referring back to FIG. 3, the result values 350 for the target upgrade databases 310 can be calculated using an inference process and a defuzzification process, which are based on the fuzzy logic rules 700 shown in FIG. 7. In this embodiment, the target upgrade databases 310 with the higher result values 350 have a higher priority for processing using upgrade resources (e.g., upgrade resources 100 shown in FIG. 1) than the target upgrade database 310 with lower result values 350. In this embodiment, the fuzzy logic rules 700 are defined so that the target upgrade databases 310 with the smallest database size 322 and largest import size 324 are considered (based on the result values 350) the best candidates for processing using upgrade resources. Accordingly, in this example embodiment, the best candidate for processing within upgrade resources is target upgrade database QA (shown in column 310).

In some embodiments, the fuzzy logic rules 700 shown in FIG. 7 can be modified so that the result values 350 are different than those shown in FIG. 3. For example, although not shown, the fuzzy logic rules 700 can be defined so that databases with relatively high ratio values 326 may have a relatively low probability of being selected for processing within upgrade resources.

In some embodiments, the rank-ordering of the target upgrade databases 310 based on the results values 350 can be overridden (e.g., ignored) during an upgrade process. For example, even though target upgrade database QA (shown in column 310) is the best candidate for processing using upgrade resources based on the result value of 93.3 (shown in column 350), a user may manually remove target upgrade database QA from a list of databases for processing within the upgrade resources.

Figure 8A:
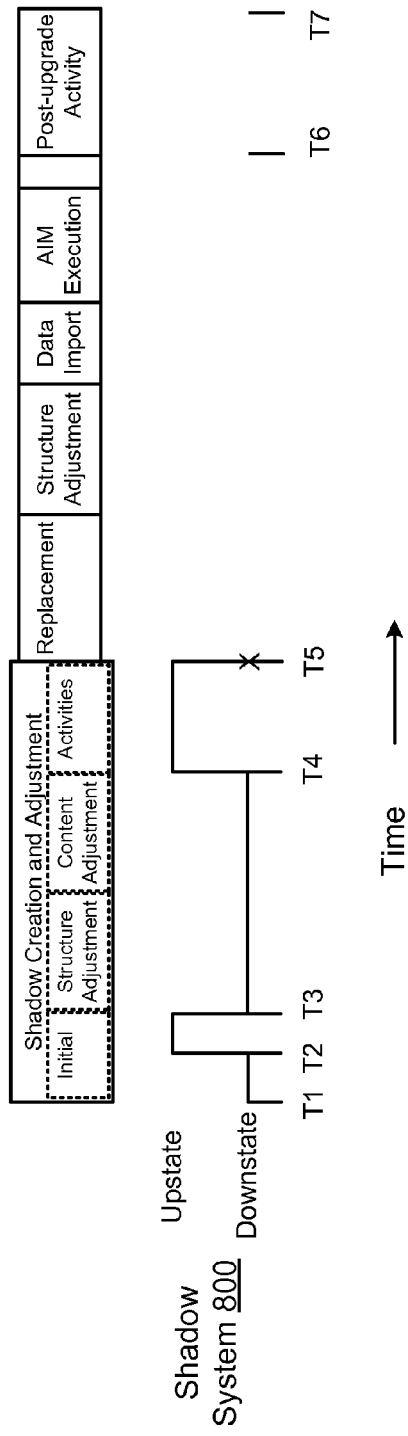
FIG. 8A illustrates upstates and downstates of a shadow system during an upgrade process.
Figure 8B:
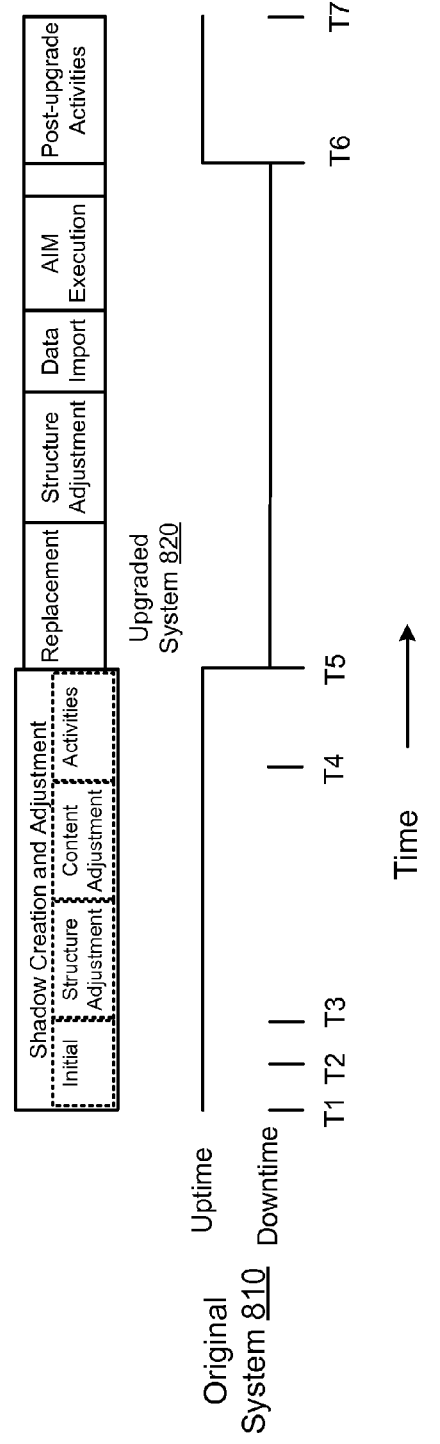
FIG. 8B illustrates uptime and downtime of an original system during the upgrade process.

FIG. 8A illustrates upstates and downstates of a shadow system 800 during an upgrade process. FIG. 8B illustrates uptime and downtime of an original system 810 during the upgrade process. As shown in FIG. 8A and in FIG. 8B, time is increasing to the right. Stages of the upgrade process are shown in both FIGS. 8A and 8B. Specifically the stages of the upgrade process include a shadow creation and adjustment stage, a replacement stage, a structure adjustment stage, a data import stage, an AIM execution stage, and a post-upgrade activity stage.

As shown in FIG. 8A and FIG. 8B, the shadow creation and adjustment stage of the upgrade process is started at time T1. As shown in FIG. 8A, the shadow system 800 can be in a downstate during portions of the shadow creation and adjustment stage of the upgrade process. Also as shown in FIG. 8A, the shadow system 800 changes to an upstate between times T2 and T3, and between times T4 and T5. As shown in FIG. 8B, the original system 810 can be in uptime (and in an upstate) during the shadow creation and adjustment stage of the upgrade process.

During the shadow creation adjustment stage (e.g., during an initial portion of the shadow creation and adjustment stage), the shadow system 800 can be created (e.g., defined), and one or more shadow databases (not shown) are defined within the shadow system 800. In some embodiments, the shadow databases can be defined, at least in part, based on a comparison with one or more target-upgrade databases (not shown).

In some embodiments, the portions of the original system 810 (e.g., original user databases) that are mirrored in the shadow system 800 can be determined using, for example, the system upgrade module 170 shown in FIG. 1 based on fuzzy logic implemented by the fuzzy logic module 130. In some embodiments, only portions of the original system 810 that are smaller than a specified database size and/or that are identified for upgrade may be transferred into the shadow system 800 for processing within the shadow system 800.

Between time T3 and time T4, during the structure adjustment and content adjustment portions of the shadow creation and adjustment stage, one or more of the shadow databases (or a portion thereof) can be created (e.g., defined) and/or modified (e.g., adjusted, modified using an alter table statement) from a default or base version (without customizations) of an upgrade (e.g., target version of the original system) to a customized version of the upgrade. In some embodiments, the customizations can be related to support packages (also can be referred to as enhancement packages) associated with the upgrade (e.g., target version of the original system). In some embodiments, the customizations can be related to support packages originally loaded onto (e.g., or later loaded onto) the shadow system 800 using, for example, a DVD. Thus, the customizations can be bound into the upgraded program level of the shadow system 800. In some embodiments, the shadow databases can be processed based on information loaded into the shadow system from, for example, an upgrade DVD, or other data repository related to an upgrade.

During the activities portion of the shadow creation and adjustment stage (between times T4 and T5), certain after import methods (AIMs) and/or execution of programs after import (XPRAs) enabled for (and/or designated for) execution within the shadow system 800 can be executed within the shadow system 800 during the initial import stage and/or the data import stage.

During the replacement stage of the upgrade process, the shadow system 800 can be dismantled (and thus does not exist as a functional system) and the remaining portions of the shadow system 800 that are upgrades to the original system 810 can be moved into the original system 810 as an upgraded system 820. Portions of the original system 810 that are not upgraded (i.e., are not subject to upgrade) may not be replaced by portions of the shadow system 800. Although not shown, in some embodiments, the original system 810 can be in an upstate, but in downtime at various times between times T5 and T6.

As shown in FIGS. 8A and 8B, the upgrade process includes a structure adjustment stage and the data import stage after the replacement stage. Databases of the original system 810 that were not selected for processing within the shadow system 800 may instead be processed during downtime of the original system 810 during, for example, the structure adjustment stage and/or data import stage. Thus, upgrading of databases of the original system 810 that is not performed between times T1 to T5 within the shadow system 800 are instead performed between times T5 and T6 during downtime of the original system 810. During the structure adjustment stage of the upgrade process, the structure of the databases of the original system 810 that are included in the original system 810 may be upgraded. As shown in FIG. 8B, at least a portion of the adjustment stage can be performed while the original system 810 is in downtime.

During times T1 through T3, copying of the databases that will be upgraded from the original system 810 to the shadow system 800 can be performed. Using the fuzzy logic methods described herein, the number of databases copied between times T1 to T3 from the original system 810 to the shadow system 800 can be defined. Accordingly, when databases are not selected from the original 810 for processing in the shadow system 800 based on the fuzzy logic methods described herein, the time during times T1 to T3 is decreased and the downtime of the original system 810 between times T5 to T6 is increased (e.g., significantly increased). It follows that when databases are selected from the original 810 for processing in the shadow system 800 based on the fuzzy logic methods described herein, the time during times T1 to T3 is increased and the downtime of the original system 810 between times T5 to T6 is decreased (e.g., significantly decreased). Thus, the fuzzy logic methods described herein have an effect on the ratio of time between times T1 to T3 and the time between times T5 to T6. In some embodiments, the ratio of the time between times T1 to T3 and the time between times T5 to T6 can be different by an order of magnitude. In some embodiments, the time between times T1 to T3 and/or the time between times T5 to T6 (and/or a ratio of the times) can change (e.g., increase, decrease) by an order of magnitude based on the databases that are selected for processing based on the fuzzy logic methods described herein.

During the data import stage, data (with an import size) can be initially transferred into one or more databases and/or can be modified. Thus, during the data import stage, new data associated with an upgrade can be imported into (and used to modify one or more user databases of) the original system 810, and also during the data import stage, the content (e.g., data) of one or more of the databases may be modified. During the data import stage, default data that can be included in one or more original program databases, original basis databases, and/or one or more original user databases can be transferred into the original system 810 from, for example, an upgrade DVD. In some embodiments, modifications of the data included in databases of the original system 810 can be performed to upgrade the data based on, for example, customizations implemented by a user of the original system 810.

During the AIM execution stage, certain AIMs and/or XPRAs that were not enabled (and/or designated) for execution within the shadow system 800 during, for example, the activities portion of the shadow creation and adjustments stage can be executed within the upgraded system 820 during the AIM execution stage. During the post-upgrade activity stage, the upgraded system 820 can be unlocked for use by one or more users and batch jobs or previously suspended can be restarted by, for example, an administrator.

Although the stages shown in FIG. 8A and in FIG. 8B are shown as discrete stages of an upgrade process, in some embodiments one or more of the stages may overlap with another stage of the upgrade process. In some embodiments, the stages (or functions thereof) described in connection with FIGS. 8A and 8B may be performed in a different order than that shown in FIGS. 8A and 8B. In some embodiments, the relative sizes of each of boxes associated with the stages shown in FIGS. 8A and 8B may not be representative of the relative durations of the respective stages.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
   an upgrade portion identifier configured to identify a plurality of databases of an original system for upgrade;
   a parameter module configured to calculate a plurality of parameter values representing aspects of the plurality of databases;
   a logic module configured to:
      for each of the plurality of databases, convert a parameter value into a degree of membership within a set representing the parameter value; and
      rank each of the plurality of databases based on the degree of membership; and
   a selection module configured to select at least a portion of the plurality of databases for upgrade during uptime of the original system based on a limitation of an upgrade resource and the ranking of each of the plurality of databases.

2. The computer system of claim 1, wherein the plurality of parameter values includes a ratio of a parameter value representing an import size of program file of a database from the plurality of databases to a parameter value representing a quantity of data included in the database.

3. The computer system of claim 1, wherein the selection module is configured to select the at least the portion of the plurality of databases for upgrade during uptime of the original system within a shadow system associated with the upgrade resource.

4. The computer system of claim 1, wherein the plurality of parameter values includes a parameter value representing a size of customer data included in a database from the plurality of databases.

5. The computer system of claim 1, wherein the plurality of parameter values includes a parameter value related to a program file configured to operate on a database from the plurality of databases.

6. The computer system of claim 1, wherein the parameter values include a parameter value representing a degree of structural adjustment to a database from the plurality of databases.

7. The computer system of claim 1, wherein the upgrade resource is a memory space allocated for an upgrade process.

8. The computer system of claim 1, wherein a remaining portion of the plurality of databases that are not selected for upgrade during uptime of the original system are scheduled for upgrade during a downtime of the original system.

9. The computer system of claim 1, wherein the ranking represents an order for duplicating the at least a portion of the plurality of databases within a shadow system during an upgrade process.

10. The computer system of claim 1, wherein at least a portion of the plurality of parameter values are normalized parameter values.

11. The computer system of claim 1, wherein the selection module is configured to select the at least the portion of the plurality of databases for upgrade during uptime of the original system within a shadow system associated with the upgrade resource, and at least a portion of the original system is replaced during downtime of the original system by the at least the portion of the plurality of databases selected for upgrade within the shadow system.

12. A non-transitory computer-readable storage medium storing code representing instructions that when executed are configured to cause a processor to perform a process, the code comprising code to:
   identify a plurality of databases of an original system for upgrade;
   calculate a plurality of parameter values representing aspects of the plurality of databases;
   for each of the plurality of databases, convert a parameter value into a degree of membership within a set representing the parameter value;
   rank each of the plurality of databases based on the degree of membership; and
   select at least a portion of the plurality of databases for upgrade during uptime of the original system based on a limitation of an upgrade resource and the ranking of each of the plurality of databases.

13. The non-transitory computer-readable storage medium of claim 12, wherein the plurality of parameter values includes a ratio of a parameter value representing an import size of program file of a database from the plurality of databases to a parameter value representing a quantity of data included in the database.

14. The non-transitory computer-readable storage medium of claim 12, further comprising code to:
   select the at least a portion of the plurality of databases for upgrade during uptime of the original system within a shadow system associated with the upgrade resource.

15. A method including executing instructions recorded on a non-transitory computer-readable storage media using at least one processor, the method comprising:
   identifying a plurality of databases of an original system for upgrade;
   calculating a plurality of parameter values representing aspects of the plurality of databases;
   for each of the plurality of databases, converting a parameter value into a degree of membership within a set representing the parameter value;
   ranking each of the plurality of databases based on the degree of membership; and
   selecting at least a portion of the plurality of databases for upgrade during uptime of the original system based on a limitation of an upgrade resource and the ranking of each of the plurality of databases.

16. The method of claim 15, wherein the plurality of parameter values includes a ratio of a parameter value representing an import size of program file of a database from the plurality of databases to a parameter value representing a quantity of data included in the database.

17. The method of claim 15, further comprising:
   selecting the at least a portion of the plurality of databases for upgrade during uptime of the original system within a shadow system associated with the upgrade resource.

* * * * *